US008647597B1

(12) United States Patent
Rainer et al.

(10) Patent No.: US 8,647,597 B1
(45) Date of Patent: *Feb. 11, 2014

(54) PROCESS OF PREPARING MINERAL MATERIAL WITH PARTICULAR CERIA-CONTAINING ZIRCONIUM OXIDE GRINDING BEADS, OBTAINED PRODUCTS AND THEIR USES

(71) Applicants: Christian Rainer, Villach (AT); Michael Pohl, Villach (AT)

(72) Inventors: Christian Rainer, Villach (AT); Michael Pohl, Villach (AT)

(73) Assignee: Omya International AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,701

(22) Filed: Oct. 23, 2013

Related U.S. Application Data

(62) Division of application No. 11/992,115, filed as application No. PCT/IB2006/002647 on Sep. 12, 2006, now Pat. No. 8,591,853.

(30) Foreign Application Priority Data

Sep. 16, 2005 (EP) .................................. 05077112

(51) Int. Cl.
*C01F 5/24* (2006.01)
*C01B 15/04* (2006.01)
*C01G 25/02* (2006.01)

(52) U.S. Cl.
USPC ....... 423/430; 423/583; 423/594.12; 423/608

(58) Field of Classification Search
None
See application file for complete search history.

(56) References Cited

U.S. PATENT DOCUMENTS

| | | | |
|---|---|---|---|
| 3,904,130 A | 9/1975 | Delfosse et al. | |
| 4,793,985 A | 12/1988 | Price et al. | |
| 5,292,365 A | 3/1994 | Delfosse | |
| 5,879,442 A | 3/1999 | Nishiguchi et al. | |
| 6,143,064 A | 11/2000 | Virtanen | |
| 2006/0292305 A1 | 12/2006 | Skuse et al. | |
| 2009/0298988 A1 | 12/2009 | Jacquemet et al. | |
| 2010/0075148 A1 | 3/2010 | Rainer et al. | |

FOREIGN PATENT DOCUMENTS

| | | |
|---|---|---|
| CN | 1359986 A | 7/2002 |
| EP | 0850880 A1 | 1/1998 |
| FR | 2203681 A1 | 5/1974 |
| JP | 59192796 U | 12/1984 |
| JP | 60005067 U | 1/1985 |
| JP | 62078111 U | 1/1985 |
| JP | 06041463 | 2/1994 |
| JP | 09150072 A | 6/1997 |
| WO | 200170643 A1 | 9/2001 |
| WO | 2004016566 A1 | 2/2004 |
| WO | 2004059079 A2 | 7/2004 |
| WO | 2007031869 A1 | 3/2007 |
| WO | 2007031870 A1 | 3/2007 |

OTHER PUBLICATIONS

The International Search Report dated Jan. 11, 2007 for PCT Application No. PCT/IB2006/002647.
The Written Opinion of the International Searching Authority dated Jan. 11, 2007 for PCT Application No. PCT/IB2006/002647.
The International Preliminary Report on Patentability dated Mar. 18, 2008 for PCT Application No. PCT/IB2006/002647.
Faber et al. "Horizontal Mill Friendly Ceramic Media with Improved Efficiency." Paint and Coatings Industry Magazine, Apr. 2001, pp. 30-38.
Mühlmeier: Mahltechnik—Technische Info: Internet Citation, Jul. 2003.
Farber et al. "Ceramic Media with Improved Efficiency." 2001, Paint & Coatings Industry Magazine, pp. 30-40.

*Primary Examiner* — Bijay Saha
(74) *Attorney, Agent, or Firm* — Amster, Rothstein & Ebenstein LLP

(57) ABSTRACT

An object of the present invention is to provide a process to grind at least one mineral material in the presence of ceria ($CeO_2$)-containing zirconium oxide grinding beads having a specific ceria content (of between 14 and 20% by weight relative to the total weight of said bead, preferably of between 15 and 18%, and most preferably of approximately 16%), and a specific average grain size (of less than 1 μm, preferably of less than 0.5 μm, and most preferably of less than 0.3 μm), wherein such beads are more resistant to wear than conventional beads of the prior art. Another object of the present invention lies in the ground material in the form of an aqueous suspension and in the form of a dry product. Another object of the present invention lies in the uses of such products in any sector making use of mineral materials, and notably in the paper, paint and plastic industries.

27 Claims, No Drawings

PROCESS OF PREPARING MINERAL MATERIAL WITH PARTICULAR CERIA-CONTAINING ZIRCONIUM OXIDE GRINDING BEADS, OBTAINED PRODUCTS AND THEIR USES

CROSS-REFERENCE TO RELATED APPLICATIONS

This is a divisional of U.S. application Ser. No. 11/992,115, filed Jun. 23, 2008, now U.S. Pat. No. 8,591,853, which is a U.S. national phase of PCT Application No. PCT/IB2006/002547, filed Sep. 12, 2006, which claims priority, to European Application No. 05077112.0, filed Sep. 16, 2005, the contents of which are hereby incorporated by reference.

It is an object of the present invention to provide a process to grind at least one mineral material in the presence of ceria ($CeO_2$)-containing zirconium oxide grinding beads having a specific ceria content (of between 14 and 20% by weight relative to the total weight of said bead, preferably of between 15 and 18%, and most preferably of approximately 16%), and a average grain size after sintering (of less than 1 μm, preferably of less than 0.5 μm, and most preferably of less than 0.3 μm).

This grain size is determined by analysis of scanning electron microscope images of the beads. Bead ceria content is analysed by ICP Optical Emission Spectrometry.

It is also an object of the present invention to provide a process to grind at least one mineral material in the presence of the abovesaid ceria-containing zirconium oxide grinding beads, wherein such beads are more resistant to wear than conventional beads of the prior art.

It is another object of the present invention to provide a process to grind at least one mineral material in the presence of the abovesaid ceria-containing zirconium oxide grinding beads, wherein such beads are more resistant to wear than conventional beads of the prior art, especially when grinding occurs under alkaline conditions (at a pH of above 7, preferably of above 10, and most preferably of above 11), and/or at high temperature (of above 60° C., preferably of above 90° C., and most preferably of above 100° C.).

It is also an object of the present invention to provide a process to grind at least one mineral material in the presence of ceria-containing zirconium oxide grinding beads, wherein at least one mineral is calcium carbonate, and preferably wherein said mineral is a mixture of ground calcium carbonate (GCC) and precipitated calcium carbonate (PCC).

Ground calcium carbonate is calcium carbonate obtained from natural sources, such as limestone, marble or chalk, and processed through a treatment such as grinding. Precipitated calcium carbonate is a synthesized material, generally obtained by precipitation following reaction of carbon dioxide and lime in an aqueous environment. This PCC may be rhombohedral and/or scalenohedral and/or aragonitic. According to the needs of the man skilled in the art, this GCC or PCC may additionally be surface treated, for example with stearine Another object of the present invention lies in the products obtained through the use of the process according to the invention, and their uses in any sector making use of mineral material, and notably in the paper, paint and plastic industries.

In the field of mineral processing by wet grinding, and notably concerning the wet grinding of calcium carbonate, it is well known to use various grinding media, such as sand, glass balls, steatite balls, molocite balls, steel balls or nylon balls, as indicated in the prior art disclosed in the document FR 2 203 681. However, such grinding media have the disadvantage of contaminating the material to be ground, due to their rapid wear, thus leading to costly operations in order to clean the grinding installations, to purify the material that have been ground and polluted by such grinding media, and to frequently renew the abovesaid grinding aid agents.

To overcome the inconveniences of such grinding media, the skilled man in the art has developed new grinding media containing zirconium. As such, it is now well known to use zirconium beads as grinding media.

JP 59 192 796 discloses a coating composition for photogravure paper, including cubic calcium carbonate particles obtained by wet crushing in a sand mill; it is mentioned that the sand mill treatment can be carried out in a sand mill, attrition mill, attritor mill, or agitation mill under wet conditions using Ottawa sand, glass beads, ceramic beads, or zirconium beads as crushing medium, during a continuous or batch process.

It has further to be noted that material comprising zirconium oxide can be used for the wet grinding of mineral material.

CN 1 359 986 discloses a process to prepare flaky heavy calcium carbonate including the steps of selecting altered calcite or coarse-grain marble, pulverizing this material, preparing a slurry of this material, superfine ball-grinding this material with zirconium (or aluminium) oxide balls having a diameter of 0.5-1.2 mm and 1.5-2 mm in a ratio of (1-2):(1-3), for a period ranging from 30 to 60 minutes, and then press filtering and drying the so-ground material. The claimed advantages of such a process are a low cost, a reduced toxicity and the non-generation of environmental pollutants via this process. JP 09 150 072 teaches a calcium carbonate slurry for use as paper filler that is obtained by a process involving a preliminary dry crushing in a vertical roller mill, followed by a three stage wet style agitator-type milling using separable abrasive grains, which are based on silica or zirconia (zirconium oxide). Superior grades of calcium carbonate are obtained through the described cost competitive, energy efficient methods. Finally, FR 2 203 681, already cited in the present Application, discloses mill grinding media for the grinding of minerals suitable for use as pigments or fillers (such as chalk from coccolith shells and talcum); this media is said to consist of, by weight, 30-70% $ZrO_2$, 0.1-5% $Al_2O_3$ and 5-20% $SiO_2$, and is preferably in the form of 0.5-10 cm diameter balls, or 0.05-0.5 centimeter diameter beads.

The skilled man in the art also knows that zirconium oxide stabilized by cerium oxide can be used as grinding media for wet milling of mineral material.

Processes to obtain such material are well described in the literature. For instance, JP 60 005 067 describes a process for the preparation of a zirconia sintered body by pre-sintering a moulded body of zirconia powder containing stabiliser, and then sintering this body at high temperature (1200-1800° C.) under high pressure (above 50 atmospheres); said stabiliser is preferably $Y_2O_3$ (yttrium oxide), MgO (magnesium oxide), CaO (calcium oxide) or $CeO_2$ (cerium oxide, also known as ceria). The obtained body exhibits high bending strength, tenacity, thermal stability, mechanical strength and oxygen-ion-conductivity at high temperature. JP 62 078 111 describes a process for the production of micro powders of stabilised zirconia by heating zirconia, silicon and $Y_2O_3$, MgO, CaO or $CeO_2$ under a non-oxidative atmosphere at reduced pressure so that the impurities in the zirconia-containing raw material are evaporated and removed. The obtained products are useful as refractory material for the steel and glass industries, as a solid electrolyte for oxygen concentration measurement sensors, as abrasive material, as pigments, or in the field of engineering ceramics "Preparation of $CeO_2$—$ZrO_2$ composite oxide with high specific surface area (Xinshiji De Cuihau Kexue Yu Jishu, Quanguo Cuihuaxue Jihuiyi Lunwenji, 10$^{th}$, Zhangjiajie, China, Oct. 15-19, 2000, 2000, 119-120), describes the preparation of CeO2-ZrO2 composites made by co-precipitation from cerium and zirconium-containing solutions in the presence of hexadecyl tri-methyl ammonium bromide and/or hexadecyl tri-methyl ammonium hydroxide, followed by calcination at 540° C. for 6 hours.

However, none of these documents reveal the use of zirconium oxide stabilized by cerium oxide for the wet grinding of mineral material.

Such products are easily available, as mentioned in commercial document published on the internet by the CERCO™ company (http://www.cercollc.com/CerCO%20Grinding%20Media%20Selection%20Criteria.html). This document highlights some of the mechanical properties of CeZrO$_2$-type zirconia, such as flexural strength, elastic modulus, compressive strength, Vicker's hardness, and fracture toughness, as compared to grinding media based on aluminium oxide. It is mentioned that such media can be used for the efficient particle size reduction of minerals such as alumina, bauxite, barium titanate, calcium carbonate, clay, kaolin, fledspar, nepheline, glass, gypsum, limestone, slax, magnesium, silica sand, talc, white cement, wollastonite and zinc.

Moreover, commercial documents published on the web by MÜHLMEIER™ (http://www.muehlmeier.de) describe the use of such zirconium oxide beads stabilised by cerium oxide as grinding media, suitable for use in a variety of applications such as in the paint and varnish industries, for the preparation of filler and coating pigments, as well as active substances for pharmaceutical, cosmetic and foods products. More precisely, this website discloses 20% ceria-containing ceria-stabilised zirconium oxide grinding beads suitable for "endless" pigment grinding. The beads are said to be dense, homogeneous, sapphire-hard and chemically resistant. However, no particular conditions (in terms of specific values of temperature and or pH) under which pigments are ground are disclosed. Moreover, no grain size of the bead material is indicated.

Finally, Zircoa™ promotes a milling media (Mill Mates™, http://www.zircoa.com/product.fine.grain/mill.mates.html) based on ceria-stabilised tetragonal zirconium polycrystal for the milling of minerals. This media allows for a finer particle size to be obtained and offers a high fracture toughness and hardness. The beads are said to be extremely wear resistant, and their controlled, consistent microstructure allows for a predictable media performance, favourable hardness and toughness. The weight percent of ceria is disclosed as being around 20%. However, no grain size is disclosed and the temperature and pH resistance of the beads is not specifically mentioned. Finally, in "Ceramic Media with Improved Efficiency" (ww.pcimag.com/CDA/ArticleInformation/coverstory/BNPCoverStoryItem/0,1848,23 348,00.html), wherein the wear resistance and other mechanical properties of Mill Mates™ beads are discussed, the grain size of these beads are disclosed as being less than 1 micron in Figure 1. It is also disclosed that these beads are stable in "moist elevated temperature environments", the elevated temperature being defined earlier as lying between 200-300° C.

In conclusion, none of these documents which deal with CeO$_2$—ZrO$_2$ grinding beads available on the market, teach the ceria content and grain size of the beads after bead sintering used in the processes of the present invention, nor that they may be used under the specific grinding conditions which are an object of the process according to the invention. These documents do not specifically reveal the particular combinations of characteristics of the CeO$_2$—ZrO$_2$ beads which are also an object of the invention, and which relate to the ceria content of said beads (of between 14 and 20% by weight relative to the total weight of said bead, preferably of between 15 and 18%, and most preferably of approximately 16%), and the average grain size after sintering of the grains forming said bead (of less than 1 μm, preferably of less than 0.5 μm, and most preferably of less than 0.3 μm).

In view of the above, there is a need to find a solution to the problem of grinding media wear resistance, especially when used under alkaline conditions (more precisely at a pH of above 7, preferably of above 10, and most preferably of above 11) and/or at high temperatures (more precisely at a temperature of above 60° C., preferably of above 90° C., most preferably of above 100° C.), for the grinding of mineral material. One object of the invention is to propose a solution to this problem.

It is noteworthy that this temperature refers to the temperature reached by the mill contents at any one point in the mill. In particular, the mill contents at the mill base may be subject to a higher temperature as a result of a higher hydrostatic pressure.

The invention relates to a process to grind at least one mineral material in the presence of ceria-containing zirconium oxide grinding beads having a specific ceria content (of between 14 and 20% by weight relative to the total weight of said bead, preferably of between 15 and 18% and most preferably of approximately 16%), and a specific average grain size after sintering (of less than 1 μm, preferably of less than 0.5 μm, and most preferably of less than 0.3 μm).

The invention also relates to a process to grind at least one mineral material in the presence of the abovesaid ceria-containing zirconium oxide grinding beads, wherein such beads are surprisingly more resistant to wear than beads of the prior art.

The invention also relates to a process to grind at least one mineral material in the presence of the abovesaid ceria-containing zirconium oxide grinding beads, wherein such beads exhibit surprising and significant wear resistance, especially when grinding occurs under alkaline conditions (at a pH of above 7, preferably of above 10, and most preferably of above 11), and/or at high temperature (at a temperature of above 60° C., preferably of above 90° C., and most preferably of above 100° C.).

The invention also relates to a process to grind at least one mineral material in the presence of ceria-containing zirconium oxide grinding beads, wherein at least one mineral is calcium carbonate, and preferably said mineral is a mixture of ground calcium carbonate (GCC) and precipitated calcium carbonate (PCC).

Accordingly, a first object of the present invention is a process of preparing a ground mineral material, comprising the steps of:
  a) providing at least one mineral material, optionally in the form of an aqueous suspension,
  b) grinding the mineral material,
  c) optionally screening and/or up concentrating the ground mineral material obtained following step (b),
  d) optionally drying the ground mineral material obtained following step (b) or (c)
characterised in that said grinding during step (b) is performed in the presence of ceria-containing zirconium oxide grinding beads having:
  a ceria content of between 14 and 20% by weight relative to the total weight of said head, preferably of between 15 and 18% by weight relative to the total weight of said bead, and most preferably of approximately 16% by weight relative to the total weight of said bead; and an average grain size after sintering of the grains forming said beads of less than 1 μm, preferably of less than 0.5 μm, and most preferably of less than 0.3 μm.

This process is also characterised in that the beads have an original diameter prior to grinding of between 0.2 and 1.5 mm, preferably of between 0.4 and 1.0 mm.

This process is also characterised in that step (b) occurs at a pH of above 7, preferably of above 10, and most preferably of above 11.

This pH increase can be the result of for example, one or more of the following: by the addition of a base, preferably of a base of a mono or divalent cation, most preferably of sodium or calcium, by the addition of an alkaline preparation of a biocide, or by the release of hydroxide, such a $Ca(OH)_2$, during grinding of a material, such as during the co-grinding of PCC and GCC. The Applicant indicates that he knows of French patent application number 05 00779, not yet published at the date of filing of the present patent application, which mentions biocides that may be added during the grinding step (b).

This process is also characterised in that step (b) occurs at a temperature of above 60° C., preferably of above 90° C., and most preferably of above 100° C.

This process is also characterised in that the concentration of mineral material to be ground in step (b) is from 10 to 80% (by dry weight of mineral material), preferably from 50 to 80%, and most preferably from 60 to 78%.

This process is also characterised in that at least one dispersing and/or grinding aid agent present in a weight % relative to the total dry mineral material ranging from 0 to 2%, preferably from 0.2 to 1.4%, and most preferably from 0.5 to 1.2%, may be added before, during or after step (b).

The skilled man in the art will choose the dispersing and/or grinding aid agent as a function of the properties he wishes to achieve. He can use, for instance, homopolymers of (meth) acrylic acid and/or copolymers of (meth)acrylic acid in combination with other water soluble monomers, such homo- and copolymers, which are totally or partially neutralised. Such dispersants may be added to obtain a stable Brookfield™ viscosity of less than 3000 mPa·s, preferably of less than 1000 in mPa·s measured at 25° C.

This process is also characterised in that the mineral material to be ground is selected from among natural or precipitated calcium carbonate, clay, talc, $Al_2O_3$, $TiO_2$ or mixtures thereof.

Preferably, the mineral material is selected from among natural or precipitated calcium carbonate, clay, talc or mixtures thereof. More preferably, it is a mixture of natural and precipitated calcium carbonate and clay, or a mixture of natural, and precipitated calcium carbonate and talc.

Most preferably, it is a mixture of natural and precipitated calcium carbonate.

According to the embodiment wherein the mineral to be ground includes GCC and PCC, the process is also characterised in that the PCC present accounts for 10 to 90% by weight of the total combined PCC and GCC weight, preferably from 20 to 80% by weight of the total combined PCC and GCC weight, and most preferably from 30 to 70% by weight of the total combined PCC and GCC weight.

The process is also characterised in that the ground mineral material obtained following step (b) presents a fraction of particles finer than 1 μm of greater than 80%, preferably of greater than 85%, more preferably of greater than 90%, and even more preferably of greater than 95%. This ground mineral material may additionally present a BET specific surface area of less than 25 m$^2$/g.

When the fraction of particles finer than 1 μm is greater than 95%, the BET specific surface area is preferably less than 25 m$^2$/g. When the fraction of particles finer than 1 μm is greater than 90%, greater than 85%, and greater than 80%, the BET specific surface area is preferably less than 20 m$^2$/g, less than 18 m$^2$/g, and less than 15 m$^2$/g, respectively.

The process according to the invention is also characterised in that in step (a), the mineral material is provided as an aqueous suspension, and in that this aqueous suspension contains from 10 to 80% by dry weight of mineral material, preferably from 50 to 80%, and most preferably from 60 to 78%. Said aqueous suspension may result from the dispersion of mineral material in the form of a wet cake.

According to the above embodiment requiring that at least one mineral provided in step (a) be in the form of an aqueous suspension, the process according to the invention is also characterised in that this mineral material is a natural calcium carbonate.

In this particular embodiment, the wet ground natural calcium carbonate may be subjected to a wet benefication step prior to step (b), allowing the removal of impurities, such as silicate impurities, for instance by froth flotation.

In another embodiment, the process according to the invention is also characterised in that step (c) is carried out.

In another embodiment, the process according to the invention is also characterised in that step (d) is carried out.

Another object of the present invention lies in the ground mineral material characterised in that it is obtained by the process according to the invention.

Another object of the invention lies in ground mineral material characterised in that it is in the form of an aqueous suspension and in that the slurry water features a $ZrO_2/CeO_2$ weight ratio of from 4 to 6.5, preferably of from 4.6 to 5.7, and most preferably of 5.3.

Zirconia (ZrO2) and ceria (CeO2) contents are determined based on ICP-OES analysis.

The previous embodiment may be further characterised in that the slurry water passed through a 40 micron sieve contains less than 1000 ppm of $ZrO_2$ and less than 200 ppm $CeO_2$.

It may also be characterised in that the ground mineral material contains natural or precipitated calcium carbonate, clay, talc, or mixtures thereof, and most preferably contains natural and precipitated calcium carbonate.

It may also be characterised in that the ground mineral material presents a steepness factor of at least about 30, preferably of at least about 40, most preferably of at least about 45. The steepness factor is defined as $d_{30}/d_{70} \times 100$, where $d_x$ is the equivalent spherical diameter relative to which x % by weight of the particles are finer.

The ground material may also feature a $d_{50}$ from about 0.2 to 2.0 μm, preferably from 0.2 to 0.8 μm, and most preferably from 0.25 to 0.45 μm. This $d_{50}$ value is determined using a Sedigraph 5100™.

It is also characterised in that it may present a fraction of particles finer than 1 μm of greater than 80%, preferably of greater than 85%, more preferably of greater than 90%, and even more preferably of greater than 95%. This ground mineral material may additionally present a BET specific surface area of less than 25 m$^2$/g.

When the fraction of particles finer than 1 μm is greater than 95%, the BET specific surface area is preferably less than 25 m$^2$/g. When the fraction of particles finer than 1 μm is greater than 90%, greater than 85%, and greater than 80%, the BET specific surface area is preferably less than 20 m²/g, less than 18 m²/g, and less than 15 m²/g, respectively.

It may also be characterised in that the aqueous suspension of ground mineral material contains at least one dispersing and/or grinding aid agent present in a weight % relative to the total dry mineral material ranging from 0 to 2%, preferably from 0.2 to 1.4%, and most preferably from 0.5 to 1.2%.

Another object of the invention lies in ground mineral material characterised in that it is in the form of a dry product and features a $ZrO_2/CeO_2$ weight ratio of 4 to 6.5, preferably of 4.6 to 5.7, and most preferably of 5.3.

Ground mineral material in a dry form is also characterised in that it contains natural or precipitated calcium carbonate, clay, talc, or mixtures thereof, and preferably contains natural and precipitated calcium carbonate.

It is also characterised in that it may present a steepness factor of at least about 30, preferably of at least about 40, and most preferably of at least about 45.

The ground material in dry form may also feature a $d_{50}$ from about 0.2 to 2.0 µm, preferably from 0.2 to 0.8 µm, and most preferably from 0.25 to 0.45 µm.

It is also characterised in that it may present a fraction of particles finer than 1 µm of greater than 80%, preferably of greater than 85%, more preferably of greater than 90%, and even more preferably of greater than 95%. This ground mineral material may additionally present a BET specific surface area of less than 25 m²/g.

When the fraction of particles finer than 1 µm is greater than 95%, the BET specific surface area is preferably less than 25 m²/g. When the fraction of particles finer than 1 µm is greater than 90%, greater than 85%, and greater than 80%, the BET specific surface area is preferably less than 20 m²/g, less than 18 m²/g, and less than 15 m²/g, respectively.

Finally, another object of the present invention lies in the use of the products according to the invention, in any sector making use of mineral material, and notably in paper, paper coatings, paints and plastics.

EXAMPLES

The following examples are intended to illustrate certain embodiments of the invention and are non-limitative.

Median diameter ($d_{50}$) and the fraction of particles featuring a diameter below a given diameter value were measured using a Sedigraph 5100™.

Example 1

This example illustrates a process of grinding a mineral material which is calcium carbonate, under classical conditions (pH=8, temperature is below 90° C., pressure is below 1 bar) and also under high pH (above 8) and/or high temperature (above 90° C.) and/or high pressure (above 3 bars) according to:
 the prior art: with the use of fused $ZrSiO_4$ grinding beads (tests n° 1 to n° 5), and also with the use of ceria-containing zirconium oxide grinding beads commercialised by Zirco™ under the name Mill Mates™, the ceria content of said bead being approximately 20% by weight relative to the total weight of said bead (tests n° 6 to 10)
 the invention (tests n° 11 to 15): ceria-containing zirconium oxide grinding beads having
  a the ceria content of said bead is 16% by weight relative to the total weight of said bead, and
  an average grain size after sintering of the grains forming said bead of 0.4 µm, and a bead diameter of 0.45 mm For tests n° 1 to 15, a natural calcium carbonate having 75% by dry weight of the particles with a mean diameter below 1 µm, was ground in a media mill.

For each example, the temperature, the pH, the pressure and the content of water (the water content being defined as the weight fraction of water relative to the total weight of the suspension) have been reported in table 1.

For each example, the rate of bead wear has been measured and expressed in terms of a "Mass loss of beads per tonne mineral produced", said mineral produced corresponding to that ground from a starting state characterised by a fraction of particles finer than 2 µm, to reach an end state characterised by a $d_{50}$ value. These values are measured by a Sedigraph 5100™. This information is reported in Table 1.

TABLE 1

| | | | | | | |
|---|---|---|---|---|---|---|
| Starting State | % particles with a diameter less than 2 um | 65 | 65 | 65 | 65 | 60 |
| End State | $d_{50}$ (µm) | 0.6 | 0.6 | 0.6 | 0.6 | 0.4 |
| Grinding conditions | pH | 8 | 12 | 12 | 8 | 8 |
| | Temperature (° C.) | <90 | <90 | 150 | 150 | 150 |
| | Pressure (bar) | <1 | <1 | 3 | 3 | 3 |
| | Water content (%) | 80 | 80 | 80 | 80 | 22 |
| | Market fused $ZrSiO_4$ (prior art) | 4 000[1] | 40 000[2] | >40 000[3] | 6 000[4] | 1 600[5] |
| Mass loss of beads per tonne mineral produced (g/tonne) | Market ceria-containing zirconium oxide grinding beads (prior art) | 170[6] | 330[7] | 17 000[8] | 8 300[9] | 670[10] |
| | ceria-containing zirconium oxide grinding beads (invention) | 165[11] | 220[12] | 300[13] | 670[14] | 100[13] |

Table 1: Mass loss of beads per tonne mineral produced, measured under various grinding conditions according to a process using grinding beads of the prior art (fused $ZrSiO_4$ beads and ceria-containing zirconium oxide grinding beads featuring 20% by weight of ceria relative to the total weight of said beads), and according to the invention (ceria-containing zirconium oxide grinding beads featuring 16% by weight relative to the total weight of said bead, with an average grain size after sintering of the grains forming said beads of 0.4 µm, and said beads have a median diameter of 0.45 mm)—the exponent indicates the number of the corresponding test.

Table 1 clearly demonstrates that the use of ceria-containing zirconium oxide grinding beads according to the invention leads to a mass loss of beads per tonne mineral produced that is significantly lower than that obtained following the same process with the use of beads of the prior art.

Example 2

This example illustrates the use of a process according to the invention wherein a natural calcium carbonate is ground with the use of ceria-containing zirconium oxide grinding beads with a ceria content of 16% by weight relative to the total weight of said bead, an average grain size after sintering of the grains forming said bead of 0.4 μm, and a median bead diameter of 0.45 mm. The ground material is then added to a coating formulation used to coat a base paper.

Ground calcium carbonate presenting a median diameter of 1.5 μm was wet-ground at a solids content of 74.5% in the presence of the following additives: 1.51% sodium polyacrylate, in a two-pass process using the above-mentioned ceria-comprising zirconium oxide grinding beads. The specific grinding energy required to obtain a final GCC with a fraction of particles less of diameter less than 1 micron of 97% for this material was of 270 kWh/t.

The obtained slurry of the ground GCC material featuring a subsequently diluted solids content of 75% was then added to a standard paper coating formulation made up of the following proportions of components:

| | |
|---|---|
| 100 parts | ground GCC material |
| 10.5 parts | SBR latex |
| 0.5 parts | synthetic thickener |
| 0.2 parts | polyvinyl alcohol |
| 0.2 parts | optical brightening agent |

The above coating was adjusted to a final solids content of 68% and applied on a standard pre-coated wood-free base paper with a grammage of 71 g/m² at a coat weight of 10 g/m²/side. This coated base paper was then calendered using a supercalender under the following calendering conditions: calender speed of 800 ml/min, calender load of 200 kN/cm and a temperature of 105° C.

The gloss of the coated paper surface was of 70% Tappi 75°.

Example 3

This example illustrates the use a process according to the invention wherein two minerals, a natural calcium carbonate and a precipitated calcium carbonate, are co-ground with the use of ceria-containing zirconium oxide grinding beads with a ceria content of 16% by weight relative to the total weight of said bead, an average grain size after sintering of the grains forming said bead of 0.4 μm, and a median bead diameter of 0.45 mm. The co-ground material is then added to a coating formulation used to coat a base paper.

A 76% solids content slurry of ground calcium carbonate presenting a median GCC diameter of 1.4 μm was ground in the presence of a 51% solids content PCC slurry with a median PCC diameter of 0.75 μm. The PCC to GCC weight ratio in the mill was of 50:50. The total solids content of the slurry in the mill was of 61% and the median diameter of 1.1. The grinder contents were then co-ground in the presence of the following total additives content: 0.95 wt % sodium polyacrylate, using ceria-comprising zirconium oxide grinding beads featuring a median bead diameter of 0.45 mm, a CeO2 content of 16% by weight relative to the total bead weight, and a grain size after sintering of 0.4 μm. The specific grinding energy required to obtain a final co-ground GCC with a fraction of particles less than 1 micron of 97% for this material was of 200 kWh/t.

The obtained slurry of the co-processed material featuring a solids content of 70.2% was then added to a standard paper coating formulation made up of the following weight proportions of components:

| | |
|---|---|
| 100 parts | co-processed material |
| 10.5 parts | SBR latex |
| 0.5 parts | synthetic thickener |
| 0.2 parts | polyvinyl alcohol |
| 0.2 parts | optical brightening agent |

The above coating was adjusted to a final solids content of 68% and applied on a standard pre-coated wood-free base paper with a grammage of 71 g/m² at a coat weight of 10 g/m²/side. This coated base paper was then calendered using a supercalender under the following calendering conditions: calender speed of 800 m/min, calender load of 200 kN/cm and a temperature of 105° C.

The gloss of the coated paper surface was of 72% Tappi 75°.

The above results are summarised in Table 2.

TABLE 2

| | Example 1 | Example 2 |
|---|---|---|
| Fraction of particles finer than 1 micron in the final ground product | 97% | 97% |
| BET specific surface area of the final ground product | 28 g/m² | 23 g/m² |
| Steepness factor of the final ground product | 35 | 42 |
| Median diameter of the final ground product | 0.27 μm | 0.27 μm |
| Total specific grinding energy required to produce the product | 270 kWh/t | 200 kWh/t |
| Tappi 75 gloss of paper coated with a formulation comprising, the product | 70% | 72% |
| Brightness of paper coated with a formulation comprising the product | 95.1% | 96.5% |
| Opacity of paper coated with a formulation comprising the product | 89.7% | 90.2% |

Table 2 illustrates that the process according to the invention allows the skilled man in the art to obtain a calcium carbonate product which leads to improved optical properties in a coated paper, at reduced specific grinding energy.

Example 4

This example illustrates the use of a process according to the invention wherein 3 minerals, a natural calcium carbonate a precipitated calcium carbonate and a clay, are co-ground with the use of ceria-containing zirconium oxide grinding beads with a ceria content of 16% by weight relative to the total weight of said bead, an average grain size after sintering of the grains forming said bead of 0.4 μm, and a median bead diameter of 0.45 mm. The co-ground material is then added to a coating formulation used to coat a base paper, and the resulting gloss is measured.

The following materials were co-ground:
  a 74% solids content slurry of ground calcium carbonate presenting a median GCC diameter of 1.4 μm and prepared using 0.27% weight (by weight of dry GCC) of an homopolymer of acrylic acid,
  a 51% solids content PCC slurry with a median PCC diameter of 0.8 μm and prepared using 0.7% weight (by dry weight of PCC) of an homopolymer of acrylic acid,
  and a 68% solids content slurry of clay commercialized by HUBER™ under the name Lithoprint™.

The weight ratio PCC:GCC:clay in the mill was of 45:45:10.

The total solids content of the slurry in the mill was of 72% and the median diameter was of 0.4 and 0.5 μm for the 2 tests illustrating the invention.

The grinder contents were then co-ground in the presence of the following total additives content:
- respectively 0.4 and 0.2 weight % (by dry weight of mineral matter) of an homopolymer of acrylic acid, where 14 mol % of the carboxylic functions are neutralized by sodium hydroxyde, having a molecular weight of 5 600 g/mol, and a polydispersity equal to 2.4,
- using ceria-comprising zirconium oxide grinding beads featuring a median bead diameter of 0.45 min, a CeO2 content of 16% by weight relative to the total bead weight, and a grain size after sintering of 0.45 μm, leading to a coground material exhibiting a median diameter respectively of 0.4 and 0.5 μm.

The 2 obtained slurry of the co-processed material was then added to a standard paper coating formulation made up of the following weight proportions of components:

| | | |
|---|---|---|
| 100 parts | co-processed material | |
| 11 parts | SBR latex (DL 966 commercialized by DOW CHEMICALS ™) | |
| 0.5 parts | synthetic thickener (CMC FF5 commercialized by FINNFIX ™) | |
| 0.4 parts | polyvinyl alcohol (PVA 4-98 commercialized by CLARIANT ™) | |
| 0.6 parts | optical brightening agent (Biancophor ™ commercialized by BAYER ™) | |

The above coating was applied on a standard topcoat base paper with a grammage of 78 g/m² at a coat weight of 10 g/m²/side. This coated base paper was then calendered using a supercalender under the following calendering conditions: calender speed of 300 m/min, calender load of 170 kN/m and a temperature of 80° C.

For the coground material exhibiting a median diameter of 0.4 μm, the gloss of the coated paper surface was of 73% Tappi 75° and 45% DIN 75°.

By comparison, the same coating manufactured with 100 parts of a GCC having a median diameter of 0.4 μm was of 70% Tappi 75° and 35% DIN 75°.

For the coground material exhibiting a median diameter of 0.5 μm, the gloss of the coated paper surface was of 68–Tappi 75° and 40% DIN 75°.

By comparison, the same coating manufactured with 100 parts of a GCC having a median diameter of 0.4 μm was of 63% Tappi 75° and 33% DIN 75°.

The invention claimed is:

1. A ground mineral material obtained by a process of preparing a ground mineral material, wherein the process comprising the steps of:
   (a) providing at least one mineral material, optionally in the form of an aqueous suspension, and
   (b) grinding the mineral material in the presence of ceria-containing zirconium oxide
      grinding beads to obtain a ground mineral material, wherein the ceria-containing
      zirconium oxide grinding beads prior to grinding have: a ceria content of between 15 and 18% by weight relative to total weight of the beads; and
      an average grain size of less than 0.5 μm;
   wherein the ground mineral material is an aqueous suspension or a dry product comprising natural calcium carbonate and/or precipitated calcium carbonate containing zirconium oxide and ceria in the range of 100 to 670 gram/ton of the ground mineral material, and wherein zirconium oxide and ceria weight ratio is in a range of 4 to 6.5.

2. The ground mineral material matter according to claim 1, is in the form of an aqueous suspension.

3. The ground mineral material according to claim 1, is in the form of a dry product.

4. The ground mineral material according to claim 1, comprising a zirconium oxide and ceria weight ratio of 4.6 to 5.7.

5. The ground mineral material according to claim 1, comprising a zirconium oxide and ceria weight ratio of 5.3.

6. The ground mineral material according to claim 1, wherein the aqueous suspension contains less than 1000 ppm of zirconium oxide and less than 200 ppm ceria when the aqueous suspension is passed through a 40 micron sieve.

7. The ground mineral material according to claim 1, which comprises natural calcium carbonate.

8. The ground mineral material according to claim 1, which comprises precipitated calcium carbonate.

9. The ground mineral material according to claim 1, having a steepness factor of at least about 30.

10. The ground mineral material according to claim 1, having a steepness factor of at least about 40.

11. The ground mineral material according to claim 1, having a steepness factor of at least about 45.

12. The ground mineral material according to claim 1, having a $d_{50}$ from about 0.2 to 2.0 μm.

13. The ground mineral material according to claim 1, having a $d_{50}$ from about 0.2 to 0.8 μm.

14. The ground mineral material according to claim 1, having a $d_{50}$ from about 0.25 to 0.45 μm.

15. The ground mineral material according to claim 1, wherein 80% of the ground mineral material particles are finer than 1 micron.

16. The ground mineral material according to claim 1, wherein 85% of the ground mineral material particles are finer than 1 micron.

17. The ground mineral material according to claim 1, wherein 90% of the ground mineral material particles are finer than 1 micron.

18. The ground mineral material according to claim 1, wherein 95% of the ground mineral material particles are finer than 1 micron.

19. The ground mineral material according to claim 1, having a BET specific surface area of less than 25 m²/g.

20. The ground mineral material according to claim 19, wherein for a fraction of particles finer than 1 μm of greater than 95%, the BET specific surface area is less than 25 m²/g.

21. The ground mineral material according to claim 19, wherein for a fraction of particles finer than 1 μm of greater than 90%, the BET specific surface area is less than 20 m²/g.

22. The ground mineral material according to claim 19, wherein for a fraction of particles finer than 1 μm of greater than 85%, the BET specific surface area is less than 18 m²/g.

23. The ground mineral material according to claim 19, wherein for a fraction of particles finer than 1 μm of greater than 80%, the BET specific surface area is less than 15 m²/g.

24. The ground mineral material according to claim 1, wherein the aqueous suspension contains at least one dispersing and/or grinding aid agent present in a weight % relative to the total dry mineral material ranging from 0 to 2%.

25. The ground mineral material according to claim 1, wherein the aqueous suspension contains at least one dispersing and/or grinding aid agent present in a weight % relative to the total dry mineral material ranging from 0.2 to 1.4%.

26. The ground mineral material according to claim 1, wherein the aqueous suspension contains at least one dispersing and/or grinding aid agent present in a weight % relative to the total dry mineral material ranging from 0.5 to 1.2%.

27. Paper, paint or plastic comprising the ground mineral material according to claim 1.

* * * * *